July 18, 1950　　　W. W. KRAUSE　　　2,515,755
BEATER EJECTOR
Filed Sept. 29, 1949

Inventor:
Walter W. Krause
By

Patented July 18, 1950

2,515,755

UNITED STATES PATENT OFFICE 2,515,755

BEATER EJECTOR

Walter W. Krause, Chicago, Ill., assignor to Dormeyer Corporation, Chicago, Ill., a corporation of Illinois Application September 29, 1949, Serial No. 118,620

14 Claims. (Cl. 259—1)

This invention relates generally to household food mixers and more particularly to an improved beater ejecting mechanism for disconnecting mixing tools from the mixer power unit.

Household food mixers usually comprise a stand or base, a mixing bowl adapted to be supported on one end of the base, and an electric motor power unit supported on the opposite end of the base so as to overhang the bowl. The mixing beaters, usually two in number, are carried by the power unit and extend downwardly into the bowl, their lower ends being so shaped as to agitate or stir the mix when they are rotated. In most household mixers the beater shafts are parallel and are spaced a predetermined distance apart, the lower ends of the beaters having spaced blades which interdigitate as the beaters are rotated in opposite directions. The upper ends or shafts of the beaters are usually received in rotary drive relationship in rotatable cylindrical spindles journalled in the power unit, the spindles being driven by the electric motor through appropriate gears.

In most constructions the beaters are removable from the spindles so that they may be readily cleaned after each use. Various devices have been provided for releasably supporting the beaters in the spindles in drive relationship. Generally, the relationship is such that the beaters are keyed to the spindles when pressed upwardly therein and are released when pulled downwardly. Friction alone may be used to hold the beaters in their working position, but in most cases some sort of spring retainer is employed which resists a slight downward pull but yields under greater force.

The ejector mechanism of this invention may be readily adapted for advantageous use in practically any mixer in which a downward force is employed either to disengage the beaters completely to permit them to drop freely out of the spindles, or simply to declutch them from the spindles to terminate the drive relationship after which they can be withdrawn the remaining distance easily by hand.

Beater ejectors have been provided in the past but they have been either cumbersome affairs which were difficult and costly to fabricate, or inconveniently located and difficult to operate.

Accordingly, an important object of this invention is to provide a simple beater ejector mechanism in which the actuating lever or trigger is conveniently located in the power unit handle where it may be actuated by movement of one finger to declutch the beaters from the driving elements. When the ejecting mechanism is located so that it may be actuated at a moment's notice, it also serves as a safety device, particularly when located where it can be struck by hand, for should the operator's fingers or an implement such as a spoon or spatula become caught between the rotating beaters the ejector may be immediately actuated to declutch the beaters before serious injury or damage to the implement or beaters can result. This is particularly important when the device is installed on modern high power mixers which deliver full power at low speeds.

Another object of the invention is to provide a beater ejector which comprises a bare minimum of parts so as to be inexpensive to fabricate and which may be readily incorporated into a wide range of mixer designs, even those where the juicer is located upon the top of the motor unit as where for example the juicer shaft is coaxial with the beater shaft.

A further object is to provide an ejector which exerts a downward force directly on the upper ends of the beater shafts when actuated, eliminating the need for thrust collars or loose running parts on the shafts, which wear and rattle.

Another object is to provide a mechanism which operates on mixers without interference with power take-off socket on the top of the unit for attachments such as juicers where the attachment drive shaft is inserted into one of the beater drive spindles from the top to couple the attachment to the drive.

A further object is to provide a mechanism which operates whether the mixer is running or at rest, yet which is completely independent of the drive mechanism and imposes no load thereon.

A further object is to provide a mechanism in which a single motion of the operator's finger accomplishes or hand disengages the beaters, no subsequent manual withdrawal being required after declutching occurs.

Other objects and advantages of the beater ejector of this invention will present themselves to those familiar with the art on reading the following specification in conjunction with the drawing and the appended claims:

Figure 2:
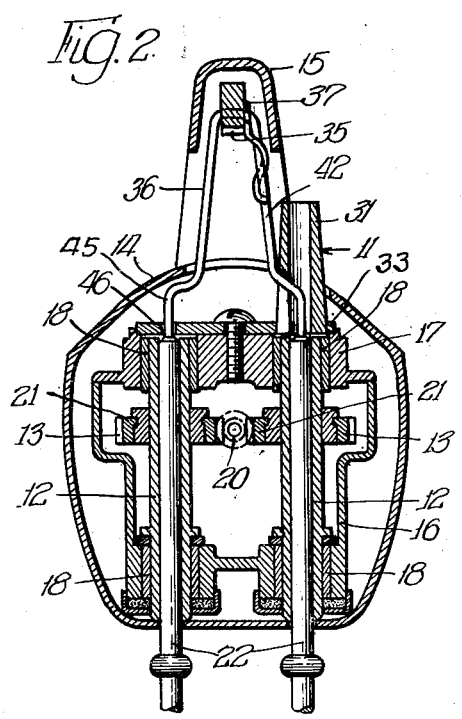
Fig. 2 is a vertical section taken on line 2—2 of Fig. 1.

A fundamental concept of this invention is to support a beater in releasable drive relationship in a drive spindle in such fashion that a downward axial force upon the beater shaft at its top end accomplishes the declutching and ejection thereof and also to provide a single member actuated by a finger or hand for applying such force quickly and easily. The ejector member is so disposed as to move downwardly to bear directly against the top center of the beater shaft when the trigger is actuated so that the minimum of friction is exerted against the shaft if the shaft is turning during ejection. When the trigger is not actuated, the actuator member remains out of contact with the shaft and imposes no load thereon.

Although but two embodiments of the invention are illustrated in the drawing as by way of example, the novel principles of this invention may be adapted to various types of power units by slight modification.

Figure 1:
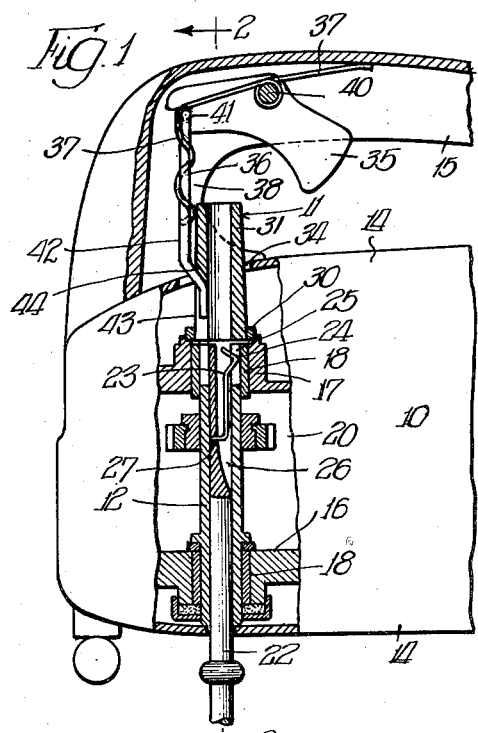
Fig. 1 is a side view, partially in section, showing a mixer power unit provided with the beater ejector of this invention.

In Figs. 1 and 2 a power unit 10 having a juicer power take-off socket 11 on the top thereof is illustrated as provided with one embodiment of this invention. However, since the beater ejector is related to the beater drive mechanism, the construction of the power unit will first be described before the beater ejector is considered.

The power unit 10 comprises an electric motor (not shown), as described generally in the Behar Patent No. 2,262,912, a pair of identical beater drive spindles 12, gears 13 for driving the spindles, a casing 14, and a handle 15 mounted on the casing. The spindles 12 are supported in an inner transmission housing 16 having a cap 17. Pairs of sleeve bearings 18 journalling the ends of the spindles 12 are mounted in the housing and cap in vertical alignment. The end of the motor armature is machined to have a worm gear 20 thereon and projects into the transmission housing 16 midway between the spindles 12 in the embodiments illustrated. Each spindle has a worm wheel 21 keyed thereto which meshes with the worm 20 on the motor armature. Thus when the motor is running the worm drive rotates the two spindles 12 in opposite directions at a reduced speed.

The beater shafts 22 are of such diameter as to slip into the hollow spindles 12 and extend the entire length thereof for rigid lateral support. In order to hold the shafts 22 in place and to drive them from and with the spindles 12 each beater shaft 22 is provided with a spring 23 having an outwardly bent portion 24 which engages in a radial kerf 25 located at the top of the corresponding spindle 12. In the embodiment illustrated, two diametrically spaced kerfs 25 are provided in each spindle. When beaters having four blades spaced at 90° are employed, it is actually preferred to employ four kerfs spaced at right angles, for the beaters on insertion need only be rotated less than 90° with respect to the spindles to align the spring 23 with one of the kerfs 25 and key the shaft to the spindle. Each spring 23 is housed in a slot 26 milled in the top of the shaft 22, the lower end of the spring 23 being bent at right angles and driven into a crosswise hole in the shaft as indicated at 27. Thus all of the spring with the exception of the projecting portion 18 is supported within the confines of the shaft 22, and the projecting portion 18 may be depressed all the way into the slot 26 by slight inward pressure.

To mount the beaters 22 in the spindles 12, the ends of the beaters are merely slid into the spindles 12 and moved upwardly to the position shown, being rotated slightly at the uppermost position to align the spring 23 with a kerf 25 so that the projecting portion 24 may spring outwardly into the kerf 25 and lock the shaft 12 to the spindle 22. During initial insertion of the upper end of the shaft 12 into the spindle the cam action of the spindle wall on the top portion of the spring 23 moves it to its depressed position.

To remove the beaters 12 manually, all that is required is to draw them downwardly. The bottom surfaces of the kerfs 25 cam the projecting portions 24 of the springs inwardly, breaking the drive relationship and release the beaters 12 for easy withdrawal.

The power take-off socket 11 on top of the unit 10 comprises a plate 30 and a socket element 31. The plate 30 is supported by a screw 32 on top of the cap 17 in a slight recess which serves to hold it in proper alignment. The socket element 31 is staked in a hole 33 in the plate 30 and projects upwardly through an opening 34 in the housing 14, the bore of the element 31 being in alignment with the bore of the corresponding spindle 22. The lower end of the drive shaft of the juicer or other attachment to be driven is preferably made exactly the same as the upper end of the beater shaft 12, and the depressible spring of the juicer shaft engages one of the kerfs 25 in exactly the same manner as does the spring 23. The length of the juicer drive shaft is such as to position the lower end level with the kerfs 25 so that engagement of the spring in a kerf may occur when the shaft is inserted.

If desired, the bore of the socket element 31 may be slightly larger in diameter than the bore of the spindle 22, and a juicer shaft having one or more fixed projections for engaging the kerfs 25 may be employed. In either case the stationary bowl element of the juicer is preferably supported directly on the outside of the upwardly directed socket element 31.

The beater ejector comprises a trigger or lever 35 mounted in the mixer handle 15, a substantially U-shaped actuator rod 36, and a return spring 37. The power unit handle 15 is hollow on the bottom side, and the ejector mechanism is housed within the hollow at the front end thereof. Skirt portions 38 on the front end of the handle 15 extend rearwardly to enclose the actuator rod 36 on the sides. This not only protects the mechanism from accidental damage but also improves the appearance of the unit. The trigger 35 is pivotally journalled on a transverse pin 40 whose ends are supported in holes drilled through the sides of the handle 15. The front end of the trigger is within the confines of the handle 15 in this particular embodiment, while the rear portion normally extends below the handle so as to be engageable by the operator's finger in the same manner as a pistol trigger, as he grasps the handle 15. Since the handle is used to support the power unit when it is off the pedestal support and to move the unit sideways through the mix in the bowl when on the support, the operator's hand is positioned conveniently near the trigger during most mixing operations, and the trigger may be moved on a moment's notice.

The spring 37 normally holds the trigger 35 in the position illustrated in Fig. 1. When pulled, the trigger rotates in the counterclockwise direction, the front end moving downwardly. The top portion of the actuator rod 36 is received in a transverse slot 41 in the front end of the trigger 35, and, accordingly, pulling the trigger causes the actuator 36 to move downwardly.

The front portion of the return spring 37 serves two functions: Being bent downwardly over the horizontal portion of the actuator rod 36 it serves to hold this portion firmly in the slot 41. The spring 37 also bears against the right-hand leg 42 of the actuator (as viewed in Fig. 2), and exerts rearward force thereon, the end of the spring 37 being reversely bent so as to cross over the leg 42.

The lower end of the actuator leg 42 normally rests in a slot 43 provided in the side of the element 31 in the position shown in Fig. 1. The upper end of this slot is inclined to form a cam surface 44 on which the leg 42 rides. When the actuator 36 is raised, the leg 42 is cammed forwardly by the interaction with this surface. When the actuator is moved downwardly, the leg 42 is moved rearwardly by the spring 37 as the leg moves down the inclined surface 44. Rearward motion of the leg 42 is checked when it is centered over the beater shaft 22 by its riding against the front surface of the element 31. Thus when elevated, the actuator leg 42 is retracted out of the shaft receiving bore of the element 31, and when depressed it is centered in the bore in beater engaging position.

The lower portion of the other leg 45 of the actuator rides in a hole 46 through the plate 30 which is centered directly over the center of the beater shaft 22 and is not movable except vertically.

As has been described, the actuator normally rests in the position shown in Fig. 1. When the trigger 35 is pulled upwardly by the operator's finger, the actuator 36 is moved downwardly. The lower end of the leg 45 moves straight down, while the other leg moves quickly downwardly and rearwardly until centered over the beater 22 under the action of the spring 37. The remaining downward motion of the actuator causes both legs to move downwardly and their ends strike the tops of the shafts 22 to move them downwardly to depress the springs 23 and declutch each of the beaters from the spindles 12. This action occurs whether the beaters are rotating or stationary. Once they have been unclutched only a slight pull is required to withdraw the beaters 22 from the unit 10.

When the beaters have been declutched and the finger pressure is released, the spring 37 returns the trigger 35 and actuator 36 to the starting position, clearing the bore in the element 31 so that the attachment shaft may be inserted if desired.

Figure 4:
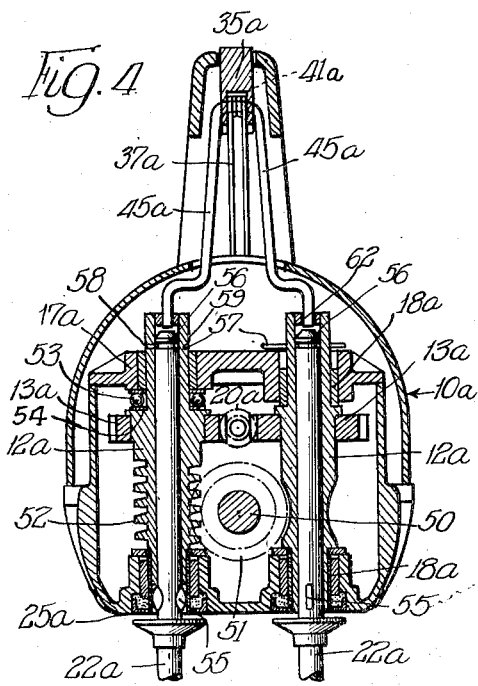
Fig. 4 is a vertical section taken on line 4—4 of Fig. 3.
Figure 3:
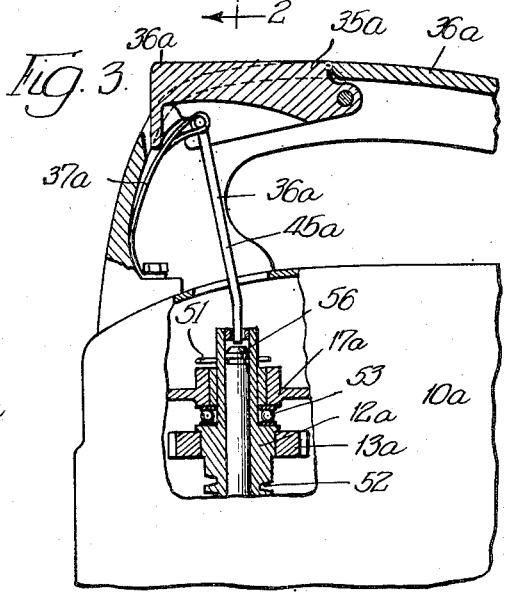
Fig. 3 is a side view similar to Fig. 1 but showing a modified embodiment of the beater ejector incorporated in a modified form of power unit having a front end power take-off shaft.

If this embodiment of the ejector is to be used on a mixer not having a power take-off shaft coaxial with one of the beater shafts, the construction is somewhat simplified, for both legs of the actuator 36 may be identical and disposed in line with the beater shafts. Such a construction is shown in Figs. 3 and 4.

The power unit 10a is somewhat modified from the one described in that the beater spindles 12a accommodate beaters 22a which are completely released when moved slightly downwardly to unclutch them. This unit is also different in that a power take-off shaft 50 is provided at the front end of the unit 10a. This shaft has a worm wheel 51 thereon which is driven by a worm gear 52 on the left-hand spindle 12a. To take up the thrust of this worm, a ball bearing 53 is provided at the top of the spindle 12a where it is located between a shoulder 54 on the spindle and the cap 17a. The spindles 12a are driven through worm wheels 13a from a worm gear 20a on the armature in the same manner as the spindles in the previously described embodiment.

The spindles 12a also differ from those previously described in that they project above the top of the cap 17a and are kerfed at the bottom instead of at the top as indicated at 25a. The beaters 22a are stamped so that each has a pair of diametrically spaced lugs or projections 55 thereon which are received in the kerfs 25a to key the beaters 22a to the spindles 12a when fully inserted.

To hold the beaters in the inserted position, the upper ends thereof are undercut slightly to provide grooves 56 which engage C-shaped springs 57 carried by the spindles 12a. Each spindle 12a is provided with a pair of saw cuts 58 and 59 on opposite sides. One cut 58 extends through the wall of the spindle into the bore thereof, while the other is only of sufficient depth to engage the spring 57. The C-shaped spring is slipped over each of the saw cuts 58 and 59, being retained thereon by its resiliency and rotating with the spindle 12a.

When the beater shaft 22a is inserted all the way into the spindle 12a, the spring 57 engages the groove 56 and latches the beater in position. However, before the beater may be inserted all the way, the projections 55 must be aligned with the kerfs 25a on the bottom of the spindle. Thus when locked in the spindle 12a the beater is also clutched or keyed thereto in drive relationship.

The beater ejector is substantially the same as in the first described embodiment except that the actuator legs 45a are both coaxial with the beater shafts 22a, being similar to the left-hand leg 45 in the first described embodiment, and the trigger element extends upwardly through the handle to a place where it is thumb controlled or struck by the operator's hand. Similarity between the legs is possible because the power take-off is on the front of the unit 10a.

The return spring 37a is different than the spring 37 in the previous embodiment but performs essentially the same function. The spring 37a comprises a length of spring wire secured to the pivot pin 42 in the front end of the handle 15a. The spring 37a is formed so as to bear against the handle so that it exerts both an upward force on the trigger 35a and a rearward force on the actuator to hold the horizontal portion firmly in the slot 41a provided in the end of the trigger 35a.

In both embodiments the opening through the housings 10 and 10a are such that the actuator can be dismantled or installed with the handle removed or with the handle mounted in place. The offsets on the legs are such that they can be moved sidewise enough to free themselves for withdrawal.

The operation of this embodiment is substantially the same as that of Figs. 1 and 2. When the trigger 35a is pressed upwardly, the front end thereof moves downwardly carrying the actuator 36a with it. The lower ends of the legs 45 move straight downwardly in the holes 62 in the tops of the spindles 12a, bearing against the tops of the shafts 22a and forcing them downwardly. The sides of the C-shaped springs are forced outwardly by the downward movement and the beaters fall freely out of the spindles 12a.

This embodiment of the invention is particularly advantageous, for the beaters need not be handled at all during removal. On completion of mixing, the operator may remove the power unit from the pedestal and hold it over the kitchen sink, dish pan, etc., before ejecting the beaters. The trigger may then be pulled and the beaters will be released to drop into the sink for subsequent washing without any manual handling thereof.

In this embodiment the return spring 37a may be eliminated entirely if desired, providing that means is substituted to hold the top of the actuator in the slot 41a, for the tops of the beaters will move the trigger 35a to the starting position when they are inserted. The spring 37a, however, is preferred for it holds the trigger securely against vibration and insures that no load is imposed on the rotating beaters.

Various changes or modifications may be made in the above described embodiments without departing from the spirit of the invention. For example, the ejector mechanism shown in Figs. 3 and 4 may be used to declutch beaters like those of Figs. 1 and 2. Similarly, the beaters of Figs. 3 and 4 will be completely released and ejected by the mechanism of Figs. 1 and 2.

It is a simple matter to adapt the ejector mechanism to other types of motor units such as those having vertically disposed motors with side handles and beater drive gearing at the bottom. The rod-like nature of the actuator element makes it easy to form this element so as to by-pass other structure and have the trigger at one side of the spindles.

Other changes such as will present themselves to those familiar with the art may also be made within the teachings of this invention whose scope is commensurate with the following claims.

What is claimed is:

1. In a food mixer of the class described, the combination of a housing, a spindle journalled in the housing, said spindle having an axial bore therein for receiving a beater shaft in driven relationship, an opening through the top of said spindle exposing the end of the beater shaft, a trigger, and a unitary actuator extending from said trigger to said spindle for moving laterally to engage the end of the beater shaft and movable axially by the trigger in said spindle to dislodge the shaft.

2. In a food mixer of the class described, the combination of a spindle journalled for rotation, said spindle having an axial bore therein for receiving a beater shaft in driven relationship, an opening through the top of said spindle exposing the end of the beater shaft, a trigger and a unitary actuator extending from said trigger to said spindle for engaging the end of the beater shaft and movable axially downwardly in the spindle by the trigger into said spindle to dislodge the shaft, said unitary actuator being the sole interconnecting link between said trigger and said shaft.

3. In a food mixer of the class described having a power unit, the combination of a spindle journalled for rotation, said spindle having an axial bore therein for receiving a beater shaft in driven relationship, an opening through the top of said spindle exposing the end of the beater shaft, a trigger and a unitary actuator extending from said trigger to said spindle for engaging the end of the beater shaft and movable axially downwardly in the spindle by the trigger in said spindle to dislodge the shaft, said trigger being exposed on top of the power unit for downward manual pressure, whereby striking the trigger with the hand will declutch the beater shaft from the spindle.

4. In a food mixer of the class described, the combination of a housing, a pair of spindles journalled in the housing parallel to each other, each of said spindles having an axial bore for receiving a beater shaft and being open at the top to expose the end of said shaft, spring means at the top of said spindles for retaining said shafts therein, clutch means at the bottom of said shaft spindles for keying the shafts thereto, a trigger, and a U-shaped actuator extending downwardly from said trigger to the top of each of said spindles for forcing said beaters downwardly to overcome said resilient means and declutch and release said shafts from said sleeves to permit the shafts to drop freely out of the spindles.

5. In a food mixer of the class described, the combination of a housing, a pair of spindles journalled in the housing parallel to each other, each of said spindles having an axial bore for receiving a beater shaft and being open at the top to expose the end of said shaft, means for engaging said shafts and spindle in drive relationship upon axial movement of one with respect to the other, a trigger, and a U-shaped actuator extending from said trigger into the spindles at the top of the shafts for forcing said beater shafts downwardly to declutch and release said shafts from said spindles, permitting the shafts to drop freely out of the spindles.

6. In a food mixer of the class described, the combination of a housing, a pair of spindles journalled in the housing parallel to each other, each of said spindles having an axial bore for receiving a beater shaft and being open at the top to expose the end of said shaft, spring means at the top of said spindles for retaining said shafts therein, a trigger, and a U-shaped actuator extending downwardy from said trigger to the top of each of said spindles for forcing said beaters downwardly to overcome said resilient means and declutch said shafts.

7. In a food mixer of the class described, the combination of a housing having an opening, a pair of spindles journalled in the housing parallel to each other below the opening, each of said spindles having an axial bore for receiving a beater shaft and being open at the top to expose the end of said shaft, resilient means for retaining said shafts in the spindles, a pivoted member, and a U-shaped actuator in its working position extending downwardly from said member through said opening to the top of each of said spindles for forcing said beaters downwardly to overcome said resilient means and declutch said shafts, said actuator being removable from said working position through said opening.

8. In a food mixer, a housing, a handle for supporting the housing, a plurality of power driven spindles journalled in the housing and open at both ends to receive beater shafts through one end in supported relationship, a manually operated trigger mounted upon the handle, and a unitary U-shaped actuator having leg portions disposed in axial alignment with the other ends of the sleeves and movable by the trigger to engage and dislodge any beater shafts supported in said spindles, said actuator being the sole interconnecting means between the trigger and the spindles.

9. In a food mixer, an ejector for a food agitator having a supporting shaft comprising a trigger, a spindle for receiving said shaft in supported drive relationship, resilient means at the top of said spindle for holding the shaft therein, clutch means at the bottom of said spindle for keying the shaft thereto when the shaft is moved to the limit of upward travel, and means actuated by said trigger including a thrust element disposed in alignment with the agitator shaft at the end thereof remote from the agitator, said thrust element having a throw controlled by said trigger within which to engage and displace the shaft of the agitator from its supported drive relationship in a direction axially thereof when the trigger is operated.

10. In a mixer of the class described, the combination including a driven spindle rotatably journalled and having an axial bore, a stationary attachment drive socket element having a bore coaxial with the bore at the spindle, said element being disposed above said spindle in close proximity thereto, clutch means at the top of said spindle for interchangeably coupling a beater shaft inserted into said spindle from the bottom thereof, an actuator member for forcing the beater shaft downwardly in said spindle to declutch same, an opening in a wall of said element into the bore thereof through which said actuator extends, and means for moving the lower end of said actuator downwardly and radially inwardly into the bore of said element.

11. In a mixer of the class described, the combination including a driven spindle rotatably journalled and having an axial bore, a stationary attachment drive socket element having a bore coaxial with the bore of the spindle, said element being disposed above said spindle in close proximity thereto, clutch means at the top of said spindle for interchangeably coupling a beater shaft inserted into said spindle from the bottom thereof, an actuator member for forcing the beater shaft downwardly in said spindle to declutch same, an opening in a wall of said element into the bore thereof through which said actuator extends, an inclined cam surface on said element over which said actuator slides for moving the lower end of said actuator radially outwardly as it is raised, and resilient means for holding said actuator in contact with the cam surface.

12. In a food mixer having a rotary drive member receiving therein in releasable drive engagement a beater shaft with the upper end of the beater shaft exposed in an axial direction, said engagement including a resilient element carried by one member and engaging the other member in releasable securement against axial displacement when said beater shaft member is disposed in operative position, the combination of a trigger and a unitary actuator extending from said trigger to a point proximate to the exposed end of said shaft member and movable axially downwardly a distance sufficient to overcome said resilient element and dislodge the beater shaft from said engagement, said unitary actuator being the sole interconnecting link between said trigger and said shaft member.

13. In a food mixer having a rotary drive member receiving therein in releasable drive engagement a beater shaft with the upper end of the beater shaft exposed in an axial direction, said engagement including a resilient element carried by one member and engaging the other member in releasable securement against axial displacement when said beater shaft member is disposed in operative position, the combination of a trigger, a unitary actuator extending from said trigger to a point proximate to the exposed end of said shaft member, and a guide for said actuator disposed at the top of said drive member, said actuator being movable axially downwardly a distance sufficient to overcome said resilient element and dislodge the beater shaft from said engagement and being the sole interconnecting link between said trigger and said shaft member, said guide maintaining the lower end of the actuator in alignment with the upper end of the beater shaft.

14. In a food mixer of the class described, the combination of a spindle journalled for rotation, said spindle having an axial bore therein for receiving a beater shaft in driven relationship and an opening through the top of said spindle exposing the end of the beater shaft, a trigger, a unitary actuator extending downwardly from said trigger for engaging the end of the beater shaft and movable axially downwardly by the trigger to dislodge the shaft, and means for maintaining the lower end of said actuator in alignment with said shaft, said unitary actuator being the sole interconnecting link between said trigger and said shaft.

WALTER W. KRAUSE.

REFERENCES CITED

The following references are of record in the file of this patent:

UNITED STATES PATENTS

| Number | Name | Date |
|---|---|---|
| 2,048,455 | Knapp | July 21, 1936 |
| 2,093,534 | Wright | Sept. 21, 1937 |
| 2,098,098 | Jepson | Nov. 2, 1937 |
| 2,293,959 | Wright | Aug. 25, 1942 |